J. BRIGGS.
ANTISKID DEVICE.
APPLICATION FILED AUG. 17, 1920
1,381,060.
Patented June 7, 1921.
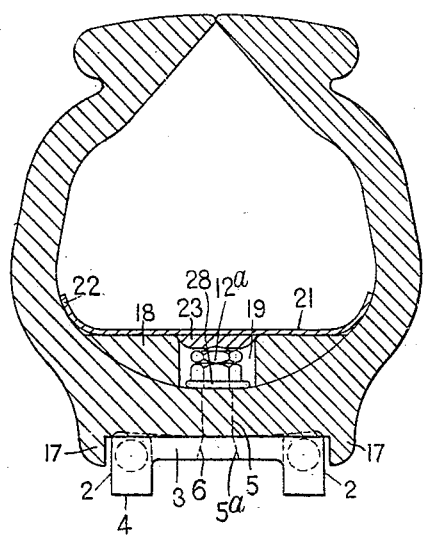
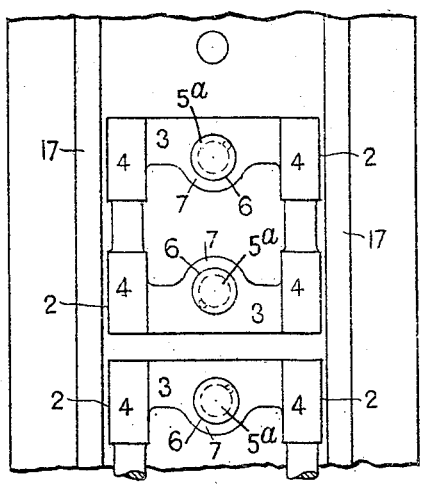
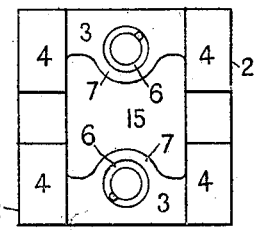
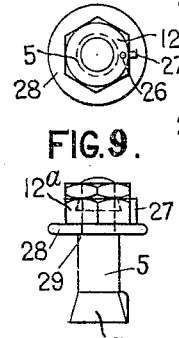
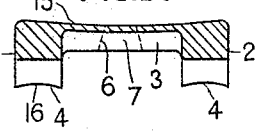
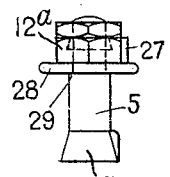
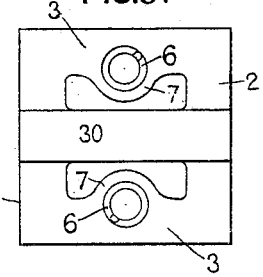
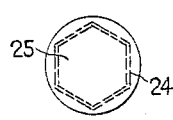
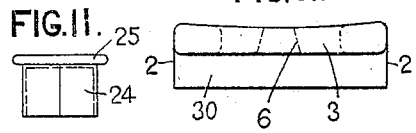
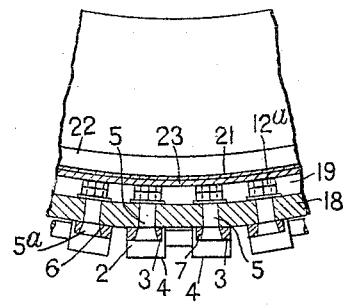

UNITED STATES PATENT OFFICE.

JAMES BRIGGS, OF HOLLINGS HILL, ESHOLT, ENGLAND.

ANTISKID DEVICE.

1,381,060.　　　　　Specification of Letters Patent.　　Patented June 7, 1921.

Application filed August 17, 1920. Serial No. 404,225.

*To all whom it may concern:*

Be it known that I, JAMES BRIGGS, a subject of the King of Great Britain, residing at Wyresdale, Hollings Hill, Esholt, in the county of York, England, have invented new and useful Improvements in Antiskid Devices, of which the following is a specification.

This invention relates to rubber tires for the wheels of motor vehicles in which studs are employed on the periphery of the wheel and serve as a means for preventing slipping or skidding upon the surface of the road over which it is running and it relates to rubber tires employing that type of non-skid studs described in the specification of British Letters Patent No. 113018, granted to me, comprising two side blocks each provided with one or more "lifts" or "treads" and connected together by transverse end bars so that only two countersunk head bolts are necessary to secure the stud or the two side blocks to the periphery of the tire, and the object of the present invention is certain improvements or modifications in the design or construction of this type of non-skid stud and in the arrangement of the studs around the periphery of the tire in conjunction with means for securing the studs to the tire and means for protecting the inner air tube from the nuts on the countersunk head bolts.

In the accompanying drawings:—

Figures 1 and 2 represent respectively a cross section of the outer cover of a pneumatic tire and an outside view of a portion of same showing the studs applied thereto and the means for securing the studs in position and the internal construction of the outer cover.

Fig. 3 is a sectional side elevation of a portion of the outer cover on a smaller scale showing the arrangement of and the means for securing the studs to the cover and the internal construction of the outer cover.

Figs. 4 and 5 are respectively an outside view and a central cross section of a stud similar to that shown in Figs. 1, 2 and 3 but showing a modification.

Figs. 6 and 7 are respectively an outside view and an end view of another modification.

Figs. 8 and 9 are respectively a plan and an elevation of a countersunk head bolt in conjunction with the locking device I preferably use for securing the studs to the outer cover of the pneumatic tire.

Figs. 10 and 11 are respectively a plan and an elevation of a cap device which may be used for covering the nuts so as to protect the inner air tube.

Referring to the drawings, each stud consists of two side blocks 2 connected together by transverse end bars 3 with the blocks projecting beyond the said transverse end bars so that only two countersunk head bolts or screws are required to secure the stud to the tire. Each block may act as one "lift" or tread but same is preferably divided by one depression or the like into two treads 4 as shown in Figs. 1 to 5 and it is obvious that the blocks may be divided by two depressions or the like into three treads 4 if desired. The studs are secured to the tire by means of countersunk head bolts 5 with lugs on the heads 5ª which heads fit corresponding recesses 6 formed in lugs 7 on the inside of the transverse end bars 3.

The studs are preferably square in plan and may have their outer and inner contact faces flat as far as the radius of the tire is concerned. Each stud may be provided with a web 15, Figs. 4 and 5, which is in contact with the outer cover and prevents any foreign matter coming into contact with the cover and also lessening the liability of the cover to puncture. The web 15 may be provided with perforations for the escape of heat should any be generated in the tire. The inner contact face of the stud shown in Figs. 4 and 5 and the inner contact parts of the stud shown in Figs. 1, 2 and 3 and also that shown in Figs. 6 and 7 may be slightly curved and concave in order that the studs may more evenly rest on the outer cover which, as shown, is flat in the transverse direction of the tire. Also the outer contact faces of the studs or the treads may be slightly hollowed out as shown at 16, Fig. 10 in order that the tread may more readily grip the road when the studs are new. The contact ends and corners of the studs with the outer cover are suitably rounded off to prevent same from injuring the rubber cover.

The outer cover is preferably constructed as shown in Fig. 1 with an annular flange or rim 17 at each side between which the studs are arranged around the periphery of the tire. The cover is provided with an annular bed 18, preferably of the shape in cross section as shown in Fig. 1, secured on the inside of the outer cover and provided with an annular groove 19 for the reception of the nuts. The said groove is covered by a lining 21 secured at one side 22 to the inside of the cover by rubber solution to protect the inner air tube from the nuts or ends of the bolts. Instead of the lining 21 or in combination with same I may employ metal caps 25, Figs. 1, 10 and 11, with a layer of rubber 24 secured to the top of same, the cap to fit tight on to the nuts. The lining 21 is reinforced in the center and is preferably provided with an annular band or cushion 23 which fits the annular groove 19 and protects the inner air tube from the nuts.

The studs are secured to the outer cover by the countersunk head bolts 5 as before described passed through the outer cover and secured by the lock nuts 12ª located within the said annular groove. The nuts employed are preferably twin lock nuts with the top nut provided with a conical boss which fits and is secured longitudinally in a corresponding recess in the bottom nut so that by giving an extra part of a turn to the top nut the nuts are locked. Figs. 8 and 9 show this kind of twin locking nut, an indentation 26 in the top nut when opposite to say a lug 27 on the bottom nut shows when the nuts are unlocked. Washers 28 are provided between the bottom nuts and the outer cover. The bolts may be provided with shoulders 29 to prevent the bottom nuts from working over the threads. Figs. 6 and 7 show a form of stud provided with one transverse tread 30 in the center. This form of stud is used alternately with any other of the forms comprising two side blocks and this combination is specially suitable for wintry weather or when the roads are covered with snow.

Claims:—

1. An anti-skid pneumatic tire, comprising, in combination, a tire casing, a plurality of metallic tread members located on the tread surface of said casing, bolts passing through said tread members and the wall of the casing for securing the tread members to the casing, a protecting strip of flexible material within the casing secured along one edge thereof to the wall of said casing and extending circumferentially and transversely thereof thereby to cover the inner ends of said bolts, cushioning means between said strip and the bolts, and cushioning means for supporting said strip circumferentially of the casing and at each side of said bolts.

2. An anti-skid pneumatic tire, comprising, in combination, a tire casing having secured to the inner surface of its tread portion a pair of circumferentially extending cushioning members spaced apart to form an annular groove, a plurality of metallic tread members located on the said surface of said casing, both passing through said tread members and the wall of the casing and into said groove, a protecting strip secured along one edge thereof to the inner surface of the casing and extending circumferentially and transversely thereof thereby to cover said groove and cushioning members, and cushioning means between said strip and the inner ends of said bolts.

In testimony whereof I have signed my name to this specification.

JAMES BRIGGS.